United States Patent
Larose et al.

[11] Patent Number: 6,148,011
[45] Date of Patent: Nov. 14, 2000

[54] WAVELENGTH SLICED SELF-SEEDED PULSED LASER

[75] Inventors: Gilles Larose, Québec; Robert Larose, Sainte-Foy; Alain Chandonnet, Cap Rouge, all of Canada

[73] Assignee: Institut National d'Optique, Sainte-Foy, Canada

[21] Appl. No.: 09/070,967

[22] Filed: May 1, 1998

[51] Int. Cl.$^7$ .............. H01S 3/30; H01S 3/13; H01S 3/10; H01S 3/115; H01S 3/117

[52] U.S. Cl. .............. 372/6; 372/6; 372/102; 372/30; 372/64; 372/66; 372/70; 372/69; 372/26; 372/12; 372/13

[58] Field of Search .............. 372/6, 102, 30, 372/64, 66, 70, 69, 26, 12, 13

[56] References Cited

U.S. PATENT DOCUMENTS

| | | | |
|---|---|---|---|
| 4,955,025 | 9/1990 | Mears et al. | 372/6 |
| 5,189,676 | 2/1993 | Wysocki et al. | 372/6 |
| 5,271,024 | 12/1993 | Huber | 372/6 |
| 5,272,513 | 12/1993 | Vahala et al. | 356/28.5 |
| 5,283,686 | 2/1994 | Huber | 359/337 |
| 5,363,192 | 11/1994 | Diels et al. | 356/350 |
| 5,434,702 | 7/1995 | Byron | 359/341 |
| 5,450,427 | 9/1995 | Fermann et al. | 372/18 |
| 5,594,747 | 1/1997 | Ball | 372/31 |
| 5,878,071 | 3/1999 | Delavaux | 372/94 |
| 5,933,271 | 8/1999 | Waarts et al. | 359/341 |

OTHER PUBLICATIONS

Myslinski P., et al., "High Power Q–switched erbium doped fiber laser" IEEE J. Quantum Electron. 28, 1,pp. 371–377, 1992;.

Lees, G.P. et al. "980nm diode pumped erbium $^{3+}$/ytterbium $^{3+}$ doped Q–switched fibre laser", Electron Lett.31,21 pp. 1836–1837, 1995;.

Chandonnet A. et al. "High power Q–switched erbium fibre laser u sing an all–fibre intensity modulator", Opt.Eng. 32, 9, pp. 2031–2035, 1993;.

Seguin F. et al. "Diode–pumped Q–switched fiber laser", Opt.Eng. 32, 9, pp. 2036–2041, 1993;.

Lees G.P. et al. "Q–switched erbium doped fibre laser utilising a novel large mode area fibre", Electron. Lett. 33, 5, pp. 393–394;.

Kafka J.D. et al. "Mode–locked erbium–doped fiber laser with soliton pulse shaping", Opt.Lett. 14, pp. 1269–1271, 1989;.

Desthieux B. et al., "111 kW (0.5mJ) pulse amplification at 1.5$\mu$m . . . " Appl.Phys.Lett. 63,5, pp. 586–588, 1993;.

Taverner D. et al. "158–$\mu$J pulses from a single–transverse–mode, large–mode–area erbium–doped fiber amplifier", Optics Lett., 22, 6, pp. 378–380, 1997;.

V.P. Gapontsev et al. "25kW peak power, wide–tune-able–repetition–rate and pulse duration eye–safe MOPFA laser", CLEO'96, pp. 209–210;.

E. Taufflieb et al., "Pulsed erbium doped fiber source using double–pass amplifier and apulsed laser diode", SPIE vol. 2841, pp. 22–27;.

*Primary Examiner*—Robert H. Kim
*Assistant Examiner*—Delma R. Flores Ruiz
*Attorney, Agent, or Firm*—Merchant & Gould P.C.

[57] ABSTRACT

A laser to produce pulses of light having predetermined spectral shapes, comprising a waveguide, an optical pump source, a gain medium to produce seed radiation, and a modulator and an array of Bragg gratings to modify the properties of the seed radiation. Once generated by the gain medium, the seed radiation propagates in the waveguide where it is first pulsed by the modulator. The resulting pulses are then selectively reflected by the Bragg gratings, which separates different spectral components of the reflected beam. This reflected beam then travels back to the modulator, which is timed to let only the desired spectral components go through. In this manner the laser is self-seeded and allows spectrum and wavelength selection from pulse to pulse.

17 Claims, 2 Drawing Sheets

WAVELENGTH SLICED SELF-SEEDED PULSED LASER

BACKGROUND OF THE INVENTION a) Field of the Invention

The present invention belongs to the field of pulsed lasers, and particularly relates to a self-seeded pulsed fiber laser allowing spectrum and wavelength selection from pulse to pulse.

b) Brief Description of Prior Art

Pulsed laser sources are currently of considerable interest, particularity for communication-related applications. It is usually desirable to produce a high peak power from a pulsed laser. Three techniques are currently used for that purpose: Q-switching, mode-locking, and gated cascade amplification.

The Q-switching method consist of switching from a high-loss to a low-loss condition in a laser cavity. A Q-switched laser system typically comprises a gain medium, pumped by a diode laser or other external source, and a mirror on each side thereof to generate the laser oscillation. The switching between a high-loss and low-loss condition is generally obtained with an acousto-optic modulator. Before switching to the low-loss condition, the gain medium is fully inverted and presents its maximum gain. Reverting rapidly to a low-loss cavity enables the build-up of a powerful pulse in the laser. The resulting peak power is fairly large, but the spectrum is often composed of several longitudinal modes and the repetition rate is generally low. Moreover, the pulsewidth is not directly adjustable, and it varies with the pumping rate, the repetition rate and the cavity optical length. Another drawback is a "jitter" of the output beam, that is substantial variations of the delay between the moment when the pulse is triggered and the launching of the pulse.

Mode-locking is another technique to obtain high peak power and short pulses, by synchronizing most of the longitudinal modes of the laser cavity with an internal modulator. The driving frequency of the modulator corresponds to the round-trip time of the cavity and has to be precisely tuned. Therefore, the repetition rate of a mode-locked laser is fixed as well as the pulsewidth, since they are determined by the physics of the cavity.

In order to have control over both the repetition rate and the pulsewidth, one can use a gated cascade amplification. A low power laser diode is first pulsed with the right repetition rate and pulsewidth and acts as a seed for a series of amplifiers, which increase the pulses power. This has the advantage of separating the pulse generation from the amplification process, both the spectral and temporal quality of the pulse then depending on the laser diode source. However, to change the wavelength, to eliminate the longitudinal modes or to change the spectral shape of the source light, one has to change the laser diode or use multiple lasers. In addition, each amplifier in the chain generates it's own noise which is then amplified by the following amplifier, rapidly saturating the pulse power. A solution to this problem is to gate each or some of the amplifiers with a switch, to limit the self-saturation of the chain. The switches must however be activated synchronously to the passage of the pulse, which makes for a very complex system.

There is therefore a need for a pulsed fiber laser with easy control over both the repetition rate and the pulsewidth, while still internally allowing for wavelength tuning and optical spectral shaping.

OBJECT AND SUMMARY OF THE INVENTION

Accordingly, an object of the present invention is to provide a pulsed laser having easily controllable and adjustable repetition rate and pulsewidth, the laser also including means to select the wavelength and spectral shape of the resulting pulses.

Another object of the present invention is to provide a laser wherein the light wavelength and spectral shape can be modified from pulse to pulse.

A further object of the present invention is to provide a laser with an output spectrum showing no longitudinal mode.

Yet another object of the present invention is to provide a laser suitable for applications such as range-finding, remote sensing or Light Identification Detection And Ranging (LIDAR).

In accordance with the invention, these objects are achieved with a laser to produce pulses of light having predetermined spectral shapes. This laser first comprises an optical waveguide, and an optical pump source coupled to the optical waveguide to inject pumping radiation to propagate therein.

The laser according to the invention also comprises a gain medium in said optical waveguide, where the pumping radiation induces a population inversion. The gain medium continuously generates seed radiation by amplified spontaneous emission. The seed radiation propagates along a first direction in the optical waveguide, and is composed of a multitude of photons each having a wavelength comprised in a bandwidth of wavelengths.

The laser according to the present invention further comprises reflecting means in said optical waveguide, for selectively reflecting the seed radiation to generate a reflected beam. The reflected beam comprises photons of different wavelengths propagating at different times in the optical waveguide, along a second direction opposed to the first direction. Adjustable modulation means are additionally included in the laser, between the gain medium and the reflecting means in said optical waveguide, the modulation means allowing radiation to pass therethrough only at predetermined times; the adjustable modulation means thereby pulse the seed radiation and select photons from the reflected beam according to their wavelength, to produce the pulses of light having the predetermined spectral shapes.

In a particularly advantageous embodiment, the present invention provides a laser to produce pulses of light having predetermined spectral shapes, this laser comprises:

an optical waveguide formed from optical fiber, wherein radiation can propagate along a first direction and a second direction opposed to the first direction;

a laser diode optical pump source, coupled to the optical waveguide to inject pumping radiation to propagate therein;

a first length of erbium-doped fiber in said optical waveguide wherein the pumping radiation induces a population inversion, the first length of erbium-doped fiber continuously generating seed radiation by amplified spontaneous emission, the seed radiation propagating along the first direction in the optical waveguide and being composed of a multitude of photons each having a wavelength comprised in a bandwidth of wavelengths, the first length of erbium-doped fiber acting as an amplification medium for radiation propagating therein along the second direction;

reflecting means in said optical waveguide comprising at least one photoinduced Bragg grating, for selectively reflecting the seed radiation to generate a reflected beam, said reflected beam comprising photons of different wavelengths propagating at different times in the optical waveguide along the second direction;

adjustable modulation means situated between the first length of erbium-doped fiber and the reflecting means in said optical waveguide, the modulation means allowing radiation to pass therethrough only at predetermined times, the adjustable modulation means thereby pulsing the seed radiation and selecting photons from the reflected beam according to their wavelength to produce the pulses of light having the predetermined spectral shapes; and a second length of erbium-doped fiber in said optical waveguide situated between the adjustable modulation means and the reflecting means, a pump by-pass allowing the pumping radiation to bypass the adjustable modulation means and propagate in said second length of erbium doped fiber to induce a population inversion therein, the second length of erbium-doped fiber acting as an amplification medium for radiation propagating therein along the first and second directions.

The present invention also provides a method to produce pulses of laser light having predetermined spectral shapes. This method comprising steps of:

a) injecting pumping radiation to propagate into an optical waveguide;

b) inducing a population inversion in a gain medium in said optical waveguide, said population inversion stimulating a continuous generation of seed radiation by amplified spontaneous emission, the seed radiation propagating along the first direction in the optical waveguide and being composed of a multitude of photons each having a wavelength comprised in a bandwidth of wavelengths;

c) modulating the seed radiation by allowing said seed radiation to pass through modulation means in the optical waveguide only at predetermined times, thereby generating pulses of seed radiation;

d) selectively reflecting the pulses of seed radiation on reflecting means in the optical waveguide to generate reflected pulses, each of said reflected pulses comprising photons of different wavelengths propagating at different times in the optical waveguide along the second direction;

e) selecting photons from the photons of different wavelengths comprised in each reflected pulse by opening the modulation means only at predetermined times, and therefor allowing only parts of said reflected pulse to pass therethrough, thereby generating pulses having the predetermined spectral shapes; and f) amplifying said pulses having the predetermined spectral shapes by propagation along the second direction through the gain medium.

The present invention and its advantages will be better understood upon reading the following non restrictive description of a preferred embodiment thereof, made with reference to the accompanying drawings.

DESCRIPTION OF A PREFERRED
EMBODIMENT OF THE INVENTION

Figure 1:
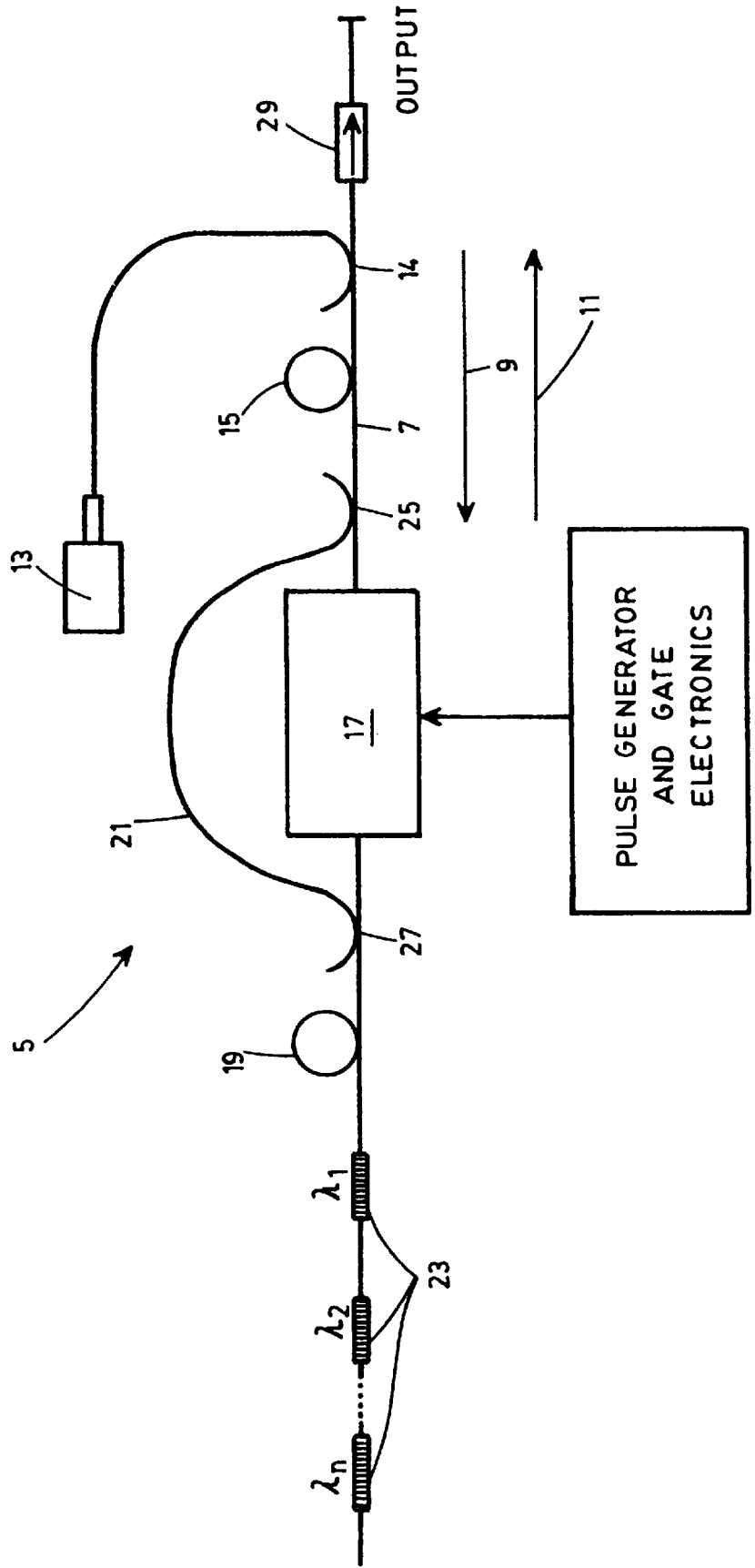
FIG. 1 is a schematic representation of a wavelength sliced self-seeded fiber laser according to a preferred embodiment of the present invention.

The laser according to the preferred embodiment of the invention shown in FIG. 1 is numbered 5. It produces pulses of light having predetermined spectral shapes, and comprises a waveguide 7, an optical pump source 13, a gain medium 15 to produce seed radiation, and modulation and reflecting means to modify the properties of the seed radiation.

The optical waveguide 7 is preferably formed from optical fiber. Light can propagate in the waveguide 7 along either a first direction, indicated on FIG. 1 by the arrow 9, or a second direction opposed to the first as represented by the arrow 11.

The laser 5 is pumped by an optical pump source 13, the pumping radiation generated by this source 13 being injected in the optical waveguide 7 to propagate therein along the first direction. In a preferred embodiment, the optical pump source 13 is a diode laser emitting light at 980 nm. The coupling of the source 13 to the optical waveguide 7 is preferably realized by a first Wavelength Division Multiplexer (WDM) 14, which allows to combine the optical signals from two different optical fibers to propagate in a single fiber. Such a coupling is often done by merging together a small area of both fibers.

The pumping radiation propagates in the optical waveguide 7 along the first direction, and induces a population inversion in the gain medium 15 placed in said waveguide 7. The gain medium 15 is preferably composed of a first length of optical fiber, integral to the waveguide and doped with rare-earth atoms, for example erbium. The use of an erbium-doped length of fiber is advantageous in that when pumped with 980 nm radiation it acts as a gain medium around 1550 nm, with a fairly large bandwidth; this spectral region is of considerable interest for applications in communication systems since it is eye-safe and suffers little scattering and absorption losses in optical fiber. Light is emitted continuously by the gain medium through a process of amplified spontaneous emission, and each photon of the resulting beam has a wavelength comprised in a bandwidth of wavelengths. Typically, this bandwidth extends between about 1450 nm to 1650 nm for an erbium-doped fiber.

The present invention uses the photons created by the amplified spontaneous emission in the gain medium as seed radiation for the lasing process. This seed radiation propagates in the waveguide 7 and is subjected to various modifications along it's path, before exiting the waveguide 7 at an extremity thereof.

To modify the temporal shape of the seed radiation, the laser 5 comprises adjustable modulation means, preferably including an electro-optic (fast risetime) or acousto-optic (slow risetime) modulator 17 controlled by the appropriate electronics. The seed radiation, propagating in the waveguide 7 along the first direction after being emitted by the gain medium 15, is pulsed by this modulator. By controlling the rate at which the modulator is opened and the duration of the openings, one can give the resulting pulses any desired repetition rate and pulsewidth, within instrumental limits.

The laser according to the preferred embodiment of the invention further comprises reflecting means in the optical waveguide, for selectively reflecting the seed radiation and thereby generate a reflected beam. The reflection of the seed radiation is selective in that it depends on the wavelength of the photons composing said seed radiation. The reflecting means therefore allow to modify the spectral shape of each pulse according to the desired resulting beam.

Appropriate reflecting means may be various types of diffraction gratings, or combinations of mirrors and filters. Preferably, the spectral shaping is accomplished by providing a series of Bragg gratings 23 in the waveguide 7, each grating having a different reflectivity spectrum than the next. A Bragg grating is a small local pertubation of the refraction index in the waveguide, acting as a mirror for a precise wavelength only while other wavelengths pass through it without being reflected. The reflectivity coefficient for the targeted wavelength is about 90 to 100%. Bragg gratings are usually transversally written in a waveguide with an UV beam. Many techniques to fabricate such gratings are known in the art, and the resulting gratings can be tailored to reflect various wavelengths with different linewidths.

By providing at least two Bragg gratings in the waveguide 7, a programmed delay $\Delta t$ may be induced between different spectral components of each pulse. The delay between two reflected components in the pulse corresponds to the time it takes light to travel from the grating reflecting the first spectral component and the one reflecting the second, and back, $\Delta t$ being therefore given by the relation:

$$\Delta t = \frac{c}{n} \cdot 2d$$

where d is the physical distance between the two gratings, c is the speed of light in vacuum and n is the refractive index of the waveguide in the space between the gratings.

The reflected beam is send back toward the modulator 17, and by choosing the precise moment at which said modulator is opened with respect to the time it takes for each part of the reflected pulse to travel from the reflecting means to the modulation means, one can then select a particular wavelength and spectral shape of the resulting pulse. In this manner, after its second passage through the modulation means the beam has been shaped both temporally and spectrally, according to desired preset parameters.

Figure 2A:
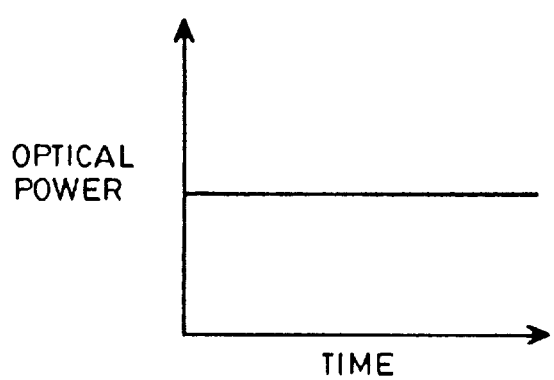
FIGS. 2A and 2B are graphic illustrations of the temporal shape of the optical power in a fiber laser such as shown in FIG. 1, respectively before and after the beam first passage through the modulation means.
Figure 2B:
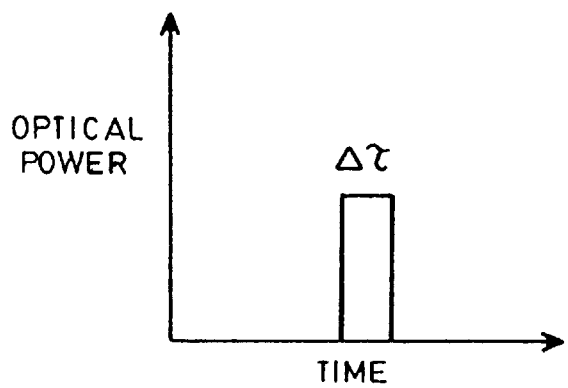
Figure 3A:
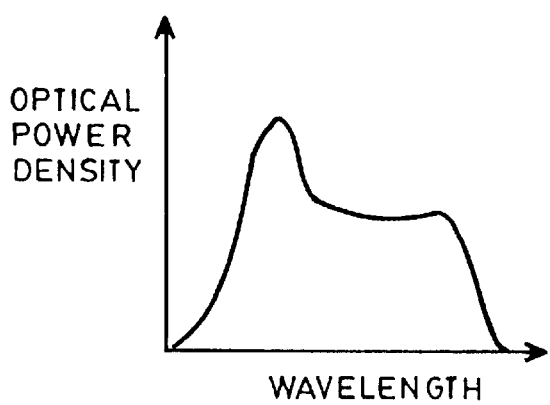
FIGS. 3A and 3B are graphic representations of the spectral shape of the optical power density in the laser, respectively before and after beam reflection on the reflecting means.
Figure 3B:
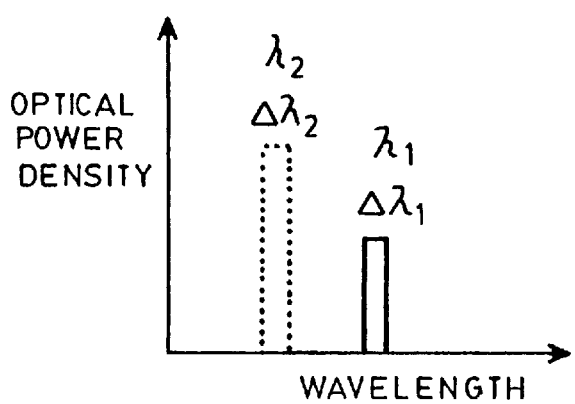
Figure 4:
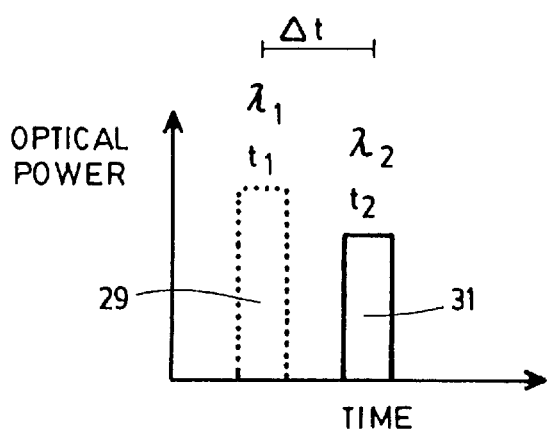
FIG. 4 is a graphic illustration of the temporal shape of two consecutive output pulses generated by a fiber laser according to an embodiment of the present invention.

Examples of the temporal shape of the optical beam respectively before and after its first passage through the modulator are shown on FIGS. 2A and 2B; FIG. 2A clearly shows the continuous nature of the seed radiation produced by the gain medium 15, and FIG. 2B illustrates a pulse of width $\Delta \tau$. FIGS. 3A and 3B illustrate the spectral shape of the propagating beam before and after it is selectively reflected by the reflecting means. As can be seem on FIG. 3A, the original seed radiation has a broad spectral content continuous along a given bandwidth. FIG. 3B shows the resulting beam after reflection on two Bragg gratings, having respective reflectivity spectra centered on wavelengths $\lambda_1$ and $\lambda_2$ and having spectral widths $\Delta\lambda_1$ and $\Delta\lambda_2$. Finally, FIG. 4 shows the resulting beam having been modified in the manner described above; two consecutive pulses 29 and 31 having different wavelengths have been produced in this example.

The laser 5 according to the preferred embodiment of the invention may also further comprise amplification means, preferably located between the modulation means and the reflecting means. This location allows for the propagating radiation to be amplified both before and after reflection on the reflecting means. The amplification means preferably comprise a second length of rare-earth doped fiber 19, integral to the waveguide 7. Erbium is again in this case a preferred dopant element. Inverting means are provided to induce a population inversion in said second length of doped fiber 19. In the preferred embodiment shown in FIG. 1, the inverting means include a pump by-pass fiber 21 allowing the original pumping radiation propagating in the waveguide 7 to by-pass the modulator 17, and propagate in the second length of doped-fiber 19. The pump by-pass fiber 21 is coupled to the waveguide 7 on both sides of the modulator 17 by second and third WDMs 25 and 27. Alternatively, the inverting means could comprise a second pump source, coupled to the waveguide 7 so as to inject pumping radiation to propagate in the second length of doped fiber 19.

It may also be noted that once the desired pulses have been created by the two consecutive passages of the beam through the modulation means, they are further amplified by propagating in the gain medium along the second direction.

After having travelled in the waveguide 7 once along each direction, the newly formed pulse having a predetermined spectral shape exits the laser 5 at one extremity thereof. This extremity is preferably provided with an optical isolator 29, which allows light to pass therethrough only in one direction, therefore blocking any outside parasite radiation from entering the waveguide 7.

In accordance with the present invention, a method to produce pulses of light having predetermined spectral shapes is also provided. The method comprises a first step of injecting pumping radiation to propagate into an optical waveguide. This pumping radiation then induces a population inversion in a gain medium in said optical waveguide; the population inversion in turn stimulates a continuous generation of seed radiation by amplified spontaneous emission, the seed radiation propagating along a first direction in the optical waveguide. The seed radiation is composed of a multitude of photons each having a wavelength comprised in a bandwidth of wavelengths.

Next the seed radiation is modulated by allowing it to pass through modulation means in the optical waveguide only at predetermined times, which generates pulses of seed radiation. These pulses of seed radiation are then selectively reflected on reflecting means in the optical waveguide, to generate reflected pulses. Each of said reflected pulses comprises photons of different wavelengths propagating at different times in the optical waveguide along a second direction, opposed to the first direction. This allows to subsequently select photons from the photons of different wavelengths comprised in each reflected pulse, by opening the modulation means only at predetermined times. Therefore only parts of said reflected pulse are allowed to pass through said modulation means, which generates the pulses having the predetermined spectral shapes. The resulting pulses are finally amplified when propagating through the gain medium along the second direction, before exiting the laser.

Preferably, the method described above comprises additional steps of amplifying the pulses of seed radiation and their reflections, when they respectively propagate along the first and second direction in the waveguide between the modulation means and the reflection means. Amplifying means may be provided therefor.

As is apparent from the above explanations, the present invention allows an easy control over both the temporal and spectral caracteristics of the resulting laser pulses. The repetition rate and pulsewidth of these pulses are solely determined by the operation parameters of the modulation means, and do not depend on one another. By providing the laser with the appropriate reflecting means, virtually any wavelength within the range of interest can be obtained, and with multiple gratings, spectrum and wavelength selection from pulse to pulse is made possible. Moreover, the linewidth of the laser is also determined by the reflecting means and may be tailored to any application with the same simplicity. Another feature of the linewidth is that it shows no longitudinal mode structure, even for wide spectrum, thus avoiding mode partition noise and other problems related to multimode spectrum.

Of course, numerous modifications could be made to the preferred embodiment disclosed hereinabove without departing from the scope of the invention as defined in the appended claims.

What is claimed is:

1. A laser to produce pulses of light having predetermined spectral shapes, said laser comprising:
   an optical waveguide;
   an optical pump source, coupled to the optical waveguide to inject pumping radiation to propagate therein;
   a gain medium in said optical waveguide, the pumping radiation inducing a population inversion in said gain medium, the gain medium continuously generating seed radiation by amplified spontaneous emission, the seed radiation propagating along a first direction in the optical waveguide and being composed of a multitude of photons each having a wavelength comprised in a bandwidth of wavelengths;
   reflecting means in said optical waveguide, for selectively reflecting the seed radiation to generate a reflected beam, said reflected beam comprising photons of different wavelengths propagating at different times in the optical waveguide along a second direction opposed to the first direction; and
   adjustable modulation means situated between the gain medium and the reflecting means in said optical waveguide, the modulation means allowing radiation to pass therethrough only at predetermined times, the adjustable modulation means thereby pulsing the seed radiation and selecting photons from the reflected beam according to their wavelength to produce the pulses of light having the predetermined spectral shapes.

2. A laser as claimed in claim 1, wherein the optical waveguide is formed from optical fiber.

3. A laser as claimed in claim 1, wherein the gain medium comprises a first length of doped fiber.

4. A laser as claimed in claim 3, wherein said first length of doped fiber includes erbium doping atoms.

5. A laser as claimed in claim 1, further comprising amplification means in the optical waveguide.

6. A laser as claimed in claim 5, wherein the amplification means are located between the reflecting means and the modulation means.

7. A laser as claimed in claim 5, wherein said amplification means comprise:
   a second length of doped fiber; and
   inverting means to induce a population inversion in the second length of doped fiber.

8. A laser as claimed in claim 7, wherein said second length of doped fiber includes erbium doping atoms.

9. A laser as claimed in claim 7, wherein said inverting means comprise a pump by-pass allowing the pumping radiation to bypass the adjustable modulation means and propagate into the second length of doped fiber.

10. A laser as claimed in claim 1, wherein the optical pump source is a laser diode.

11. A laser as claimed in claim 1, wherein the reflecting means comprise at least one Bragg grating photoinduced in the optical waveguide.

12. A laser as claimed in claim 1, wherein the modulation means comprise an electro-optic modulator.

13. A laser as claimed in claim 1, wherein the modulation means comprise an acousto-optic modulator.

14. A laser as claimed in claim 1, further comprising an optical isolator at one end of the optical waveguide.

15. A laser to produce pulses of light having predetermined spectral shapes, said laser comprising:
   an optical waveguide formed from optical fiber, wherein radiation can propagate along a first direction and a second direction opposed to the first direction;
   a laser diode optical pump source, coupled to the optical waveguide to inject pumping radiation to propagate therein;
   a first length of erbium-doped fiber in said optical waveguide wherein the pumping radiation induces a population inversion, the first length of erbium-doped fiber continuously generating seed radiation by amplified spontaneous emission, the seed radiation propagating along the first direction in the optical waveguide and being composed of a multitude of photons each having a wavelength comprised in a bandwidth of wavelengths, said first length of erbium-doped fiber acting as an amplification medium for radiation propagating therein along the second direction;
   reflecting means in said optical waveguide comprising at least one photoinduced Bragg grating, for selectively reflecting the seed radiation to generate a reflected beam, said reflected beam comprising photons of different wavelengths propagating at different times in the optical waveguide along the second direction;
   adjustable modulation means situated between the first length of erbium-doped fiber and the reflecting means in said optical waveguide, the modulation means allowing radiation to pass therethrough only at predetermined times, the adjustable modulation means thereby pulsing the seed radiation and selecting photons from the reflected beam according to their wavelength to produce the pulses of light having the predetermined spectral shapes; and
   a second length of erbium-doped fiber in said optical waveguide situated between the adjustable modulation means and the reflecting means, a pump by-pass allowing the pumping radiation to bypass the adjustable modulation means and propagate in said second length of erbium doped fiber to induce a population inversion therein, the second length of erbium-doped fiber acting as an amplification medium for radiation propagating therein along the first and second directions.

16. A method to produce pulses of laser light having predetermined spectral shapes, said method comprising steps of:
   a) injecting pumping radiation to propagate into an optical waveguide;
   b) inducing a population inversion in a gain medium in said optical waveguide, said population inversion stimulating a continuous generation of seed radiation by amplified spontaneous emission, the seed radiation propagating along a first direction in the optical waveguide and being composed of a multitude of photons each having a wavelength comprised in a bandwidth of wavelengths;

c) modulating the seed radiation by allowing said seed radiation to pass through modulation means in the optical waveguide only at predetermined times, thereby generating pulses of seed radiation;

d) selectively reflecting the pulses of seed radiation on reflecting means in the optical waveguide to generate reflected pulses, each of said reflected pulses comprising photons of different wavelengths propagating at different times in the optical waveguide along a second direction opposed to the first direction;

e) selecting photons from the photons of different wavelengths comprised in each reflected pulse by opening the modulation means only at predetermined times, and therefore allowing only parts of said reflected pulse to pass therethrough, thereby generating pulses having the predetermined spectral shapes; and f) amplifying said pulses having the predetermined spectral shapes by propagation along the second direction through the gain medium.

17. A method as claimed in claim 16, respectively comprising after steps c) and d) first and second additionnal steps, said first additionnal step comprising amplifying the pulses of seed radiation by propagation along the first direction through amplifying means in the optical waveguide, and said second additional step comprising amplifying said reflected pulses by propagation along the second direction through the amplifying means.

* * * * *